S. PIERCE.
Coffee Roaster.
No. 13,447.
Patented Aug. 14, 1855.
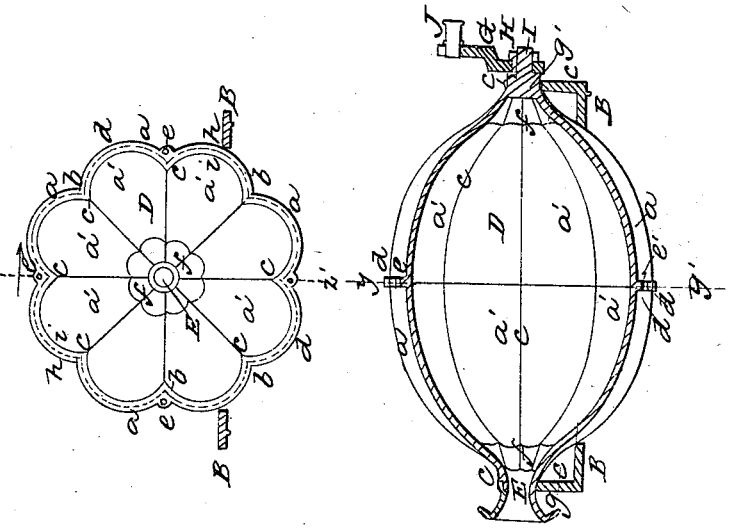
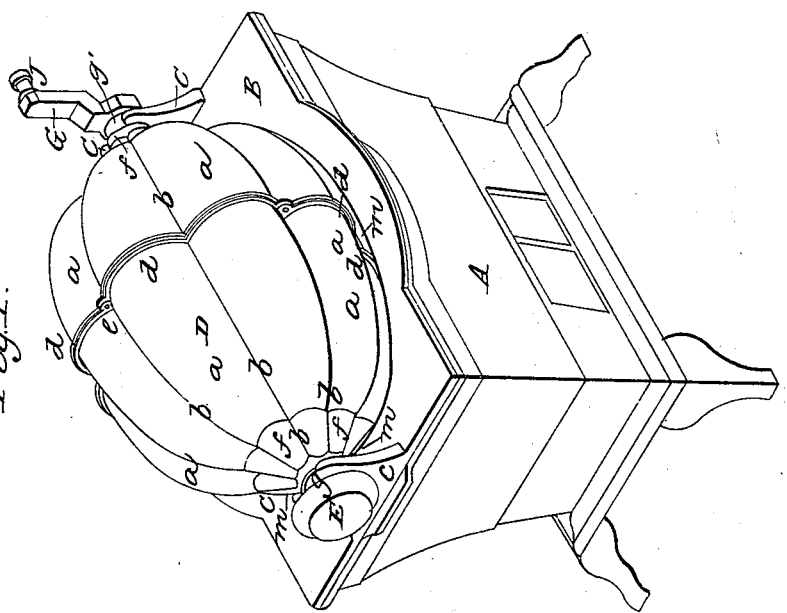

UNITED STATES PATENT OFFICE.

SAML. PIERCE, OF TROY, NEW YORK, ASSIGNOR TO CURTIS B. PIERCE.

COFFEE-ROASTER.

Specification of Letters Patent No. 13,447, dated August 14, 1855.

*To all whom it may concern:*

Be it known that I, SAMUEL PIERCE, of Troy, in the county of Rensselaer, in the State of New York, have invented a new and useful Improvement in Coffee-Roasters; and I do hereby declare that the following is a full and exact description thereof, reference being had to the annexed drawings, making a part of this specification, in which—

Figure 1 is an isometrical representation; Fig. 2, a longitudinal section; and Fig. 3 a transverse section.

The same letters refer to like parts in all the figures.

My improvement relates to the means of stirring and mixing the coffee during the roasting process.

The distinguishing characteristic of my improvement consists in making or composing the interior surface of a spheroidal roasting vessel, of a series of longitudinal angular parts projecting inward, and alternating with coextensive, concave, hollow parts, swelling outward; to completely stir and mix the coffee as the vessel is revolved during the operation of browning or roasting the coffee; the shell or sides of the vessel being made of uniform thickness so as to make the external form of the vessel resemble that of a muskmelon.

The construction and operation of a portable coffee roaster as improved by me, is as follows, viz:

A is an ordinary cast iron portable furnace, with a top, B, having an opening, $m$, suited in size and shape to surround the lower side of the spheroidal roasting vessel, D, that is supported by its journal $g$, $g'$, resting in hollows in the tops of the standard, C, C, that rise from the plate B. These journals are made to rest and turn in open boxes so that the end of $g'$ of the vessel, can be raised without any hindrance, to prove the condition of the roasting coffee.

G is a crank, fastened to the solid journal, to give rotary motion to the roasting vessel. The other journal, $g$, is hollow, the opening B, being about one inch in diameter, or sufficiently large to allow the roasted coffee to be freely poured from the vessel therethrough. The outer portion of this journal is expanded and made funnel-form; to allow the vessel to be easily charged; and the part of the vessel continuous thereto, $f$, is made of that shape also, to allow the vessel to be quickly emptied. The other end, $f'$, of the vessel is made of the same shape to make the vessel symmetrical in form.

$c$, $c$, $c$, are the angular portions of the interior surface, that project inward, extend longitudinally and alternate with the concave parts $a'$, $a'$, $a'$.

$b$, $b$, $b$, $b$, are the correlative angular longitudinal grooves and $a$, $a$, the swelling ridge of the outer surface.

By this construction of the inner surface the coffee is lifted, stirred and mixed as the vessel revolves, in the most thorough manner; while the heating surface is incidentally greater than if the vessel was a plain spheroid.

I make the vessel—or roaster—of cast iron, and as thin in its sides as can be conveniently cast; and "in halves", they being permanently fastened to each other afterward, at $y$, $y'$, Fig. 2, by the rivets $e'$, $e'$, through the ears in the flanches $d$, $d$; this being a cheap and substantial mode of construction.

Although I consider the above described prolate spheroidal shape of the roasting vessel to be best; yet if the roaster is made cylindrical or spherical in form, its operation will be convenient when it is constructed with a hollow journal having funnel-form extremities, and fully effectual when the inner surface of the roaster is composed of a series of alternate angular projections and rounded depressions as described; and I regard such forms as mere modifications of my standard of construction. And the roasting vessel, constructed as above described may be used upon other heaters than portable furnaces, as cooking stoves, or ranges, and I contemplate such application and use when desirable.

To roast coffee in this apparatus:—take the roasting vessel from, and make a fire in, the furnace. Then pour enough coffee into the roasting vessel through its hollow journal to make it one third full, or less. Then put the roaster back upon the furnace and turn the crank steadily, by means of a slat or rod of wood that has a hole through one end that the pin, J, is slipped into, until the coffee needs "trying". Then raise the crank end of the vessel and let a little of the coffee run out. If it is "browned" enough, pour it all out; if not, turn on until, by proving, the coffee is found "done".

I am aware that it is not new to combine a cylindrical or a spherical roasting vessel with a portable furnace or other heater; nor to make the journals of a cylindrical roasting vessel hollow; and I do not claim any such combination or modes of construction.

What I claim and desire to secure by Letters Patent, is:

Constructing the roasting vessel of a series, of alternate longitudinal angular parts, projecting inward; and coextensive concave portions, swelling outward, substantially as described for the purpose specified.

SAMUEL PIERCE.

Witnesses:
R. CRUIKSHANK,
AUSTIN F. PARK.